United States Patent
Dasgupta et al.

(10) Patent No.: US 6,261,722 B1
(45) Date of Patent: Jul. 17, 2001

(54) LITHIUM BATTERY HAVING IMPROVED CURRENT COLLECTING MEANS

(76) Inventors: Sankar Dasgupta, Electrofuel Inc. 21 Avenue, Unit 10, Toronto, Ontario (CA); Rakesh Bhola, 12 Harlton Crescent, Toronto, Ontario M6M 1L1 (CA); James K. Jacobs, 69 Albany Avenue, Toronto, Ontario (CA)

( * ) Notice: Subject to any disclaimer, the term of this patent is extended or adjusted under 35 U.S.C. 154(b) by 0 days.

(21) Appl. No.: 09/361,977

(22) Filed: Jul. 28, 1999

(51) Int. Cl.[7] .............. H01M 6/18; H01M 4/62; H01M 4/58; H01M 4/66
(52) U.S. Cl. .......... 429/304; 429/217; 429/231.1; 429/231.4; 429/231.95; 429/232; 429/245
(58) Field of Search ..................... 429/217, 232, 429/231.1, 231.95, 231.4, 245, 304

(56) References Cited

U.S. PATENT DOCUMENTS

| | | | |
|---|---|---|---|
| 4,565,751 | * 1/1986 | Faust et al. | 429/94 |
| 4,956,247 | * 9/1990 | Miyazaki et al. | 429/194 |
| 5,153,082 | * 10/1992 | Ogino et al. | 429/194 |
| 5,234,778 | * 8/1993 | Wright | 429/103 |
| 5,464,707 | 11/1995 | Moulton et al. | 429/212 |
| 5,554,459 | 9/1996 | Gozdz et al. | 429/194 |
| 5,571,640 | * 11/1996 | Takeuchi et al. | 429/209 |
| 5,589,297 | 12/1996 | Koga et al. | 429/212 |
| 5,686,201 | * 11/1997 | Chu | 429/52 |
| 5,824,120 | 10/1998 | Mitchell et al. | 29/623.1 |
| 5,856,043 | 1/1999 | Ohsaki et al. | 429/218 |
| 5,856,045 | * 1/1999 | Fautuex et al. | 429/232 |
| 5,989,747 | * 11/1999 | Tanaka et al. | 429/231.95 |
| 6,046,268 | * 4/2000 | Ochoa et al. | 524/495 |

* cited by examiner

*Primary Examiner*—Tom Dunn
*Assistant Examiner*—Zidia Pittman

(57) ABSTRACT

Lithium electrochemical cells and batteries are described having electron conductive additives in the form of a mixture of carbon fibres and fine carbon particles. The electron conductive additives are provided in a polymeric fluoride coating between the electrode and the current collector. A mixture of carbon fibres and fine carbon can also be admixed with the cathode-active component in the cathode.

16 Claims, 1 Drawing Sheet

LITHIUM BATTERY HAVING IMPROVED CURRENT COLLECTING MEANS

FIELD OF INVENTION

This invention is related to alkali metal electrochemical cells, in particular to lithium electrochemical cells or batteries.

BACKGROUND OF THE INVENTION

Electrochemical cells able to convert chemical to electrical energy are a well known source of energy. Electrochemical cells which are based on alkali metal ions, more specifically on lithium ions, have been found to have very advantageous characteristics, such as high energy density per unit volume or unit weight. Lithium electrochemical cells can operate as primary cells, but more often utilization is in the form of secondary, rechargeable cells or rechargeable batteries. Lithium batteries or cells may be button shaped, cylindrically or prismatically wound, or flat, composed of layers, known as planar or laminar cells or planar batteries. Lithium electrochemical cells or batteries include a negative electrode or anode, containing a substance capable of intercalating lithium, or lithium metal or an alloy of lithium, as the negative active component. The positive active component of the cathode is usually a chalcogenide of a transition metal and lithium, such as lithium-manganese oxide, lithium-cobalt oxide, or similar compounds which are stable under the conditions of operation and can incorporate lithium ions in their structure reversibly. A lithium cell and/or battery commonly has a non-aqueous electrolyte which may be a porous separator impregnated with an organic liquid or gel containing a dissolved lithium salt, or a solid polymer laminate containing a dissociable lithium compound, or granules of electrolyte mixed with particles containing one of the electrode active compounds. Lithium batteries are usually equipped with current collectors in close proximity of the electrodes, which can be a metal plate, rod, metal foil carried by a polymer laminate, or a similar electrically conducting structural element.

The energy output of a cell or battery is strongly affected by the manner of collecting the current generated by the electrochemical reaction. There are known methods to improve contact between the metallic current collectors and the adjacent electrodes. Methods of etching, cleaning or micro-roughening the surface of the current collector in contact with the electrode have been described. Inserting a separate layer of an electronically conducting polymer or a polymer loaded with electrically conducting carbonaceous or inorganic particles, between the metallic current collector and the electrode of the electrochemical cell are known. Methods are also known to increase adhesion between the electrode and the current collector. The adhesion promoting layer can be coated onto the current collector as a polymer coating carrying conductive particles, which may be subsequently cured by known methods or the solvent in the polymer solution is evaporated. The electrically conducting particles in the adhesion promoting coating are most frequently fine carbon or carbon black, but may be fine particles of metal or electrically conducting oxides, or such like. Adding conductive binders or admixing carbon or metallic particles or metal coated carbon fibres to increase the conductivity of the electrode mixture itself are known. Examples of lithium batteries incorporating some of the above discussed features are provided in U.S. Pat. No. 5,464,707, issued to Moulton et al. on Nov. 7, 1995, in U.S. Pat. No. 5,589,297, issued to Koga et al. on Dec. 31, 1996, and in U.S. Pat. No. 5,554,459, issued to Gozdz et al. on Sep. 10, 1996. U.S. Pat. No. 5,824,120, issued to Mitchell et al. on Oct. 20, 1998, describes an electrically conductive adhesion promoter layer located between the current collector surface and the cathode. The adhesion promoter layer of Mitchell et al. is made of a polymeric material, such as acrylics or acetates, containing conductive particles which may be graphite particles, hollow carbon fibres, ultrafine metal powders, metal coated carbon fibres, metal coated or conductive polymeric fibres or inorganic particles, such as indium tin oxide.

Carbon or graphitic particles capable of intercalating lithium ions or carbon fibres are frequently utilized in the anode mixed into a paste with an tonically conducting binder. Ohsaki et al. in U.S. Pat. No. 5,856,043 teach a lithium cell anode made of 87–95% vapour-grown graphitized carbon fibres mixed with a binder. The conductivity of the cathode is adjusted by the addition of carbon black.

As discussed above, fine carbon particles have been deployed as a means of increasing electronic conductivity between the current collector and the positive active material, either in a coating or layer directly in contact with the current collector, or mixed with the oxidic or sulphidic electrode-active material. The individual particles of carbon, however, may be isolated from one another or from the current collector by other components in the mixture forming the electrode coating or the electrode paste, thus reducing the effectiveness of electron transfer. Moreover, the resistance of current collector surface in touch with the electrode or the conductivity enhancing layer may have local variations, hence increase in lateral conductivity can be a desirable feature.

SUMMARY OF THE INVENTION

There is a need for improving electrical contact between the current collector and the positive active material of the cathode in a lithium battery. For the best energy utilization of lithium cells and batteries easy electron passage is required both in the shortest distance between the electrode and the current collector as well as in lateral directions.

By one aspect of the invention a mixture of fine carbon and carbon fibres are added to a fluorinated polymer having melting point higher than 70° C., to form a mixture which is coated on the current collector surface in contact with the positive electrode of a lithium electrochemical cell.

By another aspect of the invention a mixture of fine carbon and carbon fibres, is blended with the positive active material and optionally with an tonically conductive binder compound, to provide a cathode material of a lithium battery.

Figure 1:
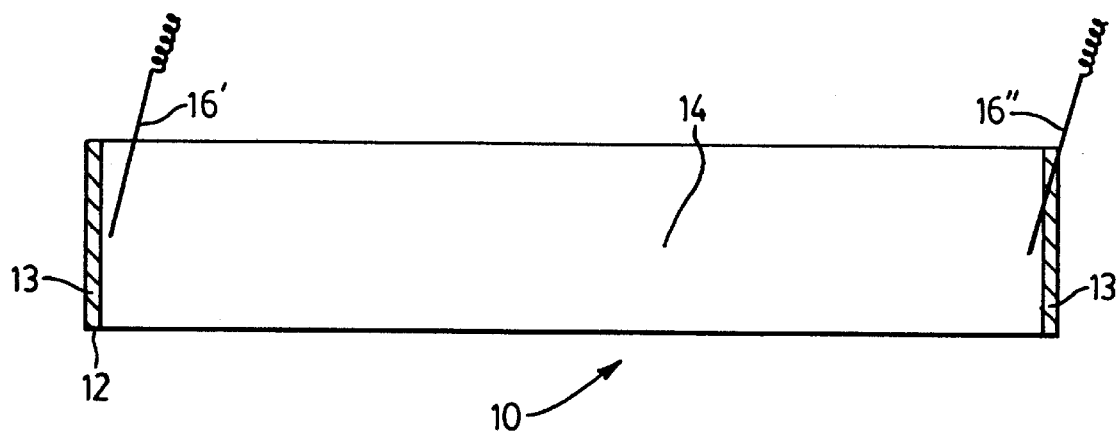
FIG. 1 shows schematically conductivity measurements taken in the lateral direction on a conductive particles containing coating.

The preferred embodiments of the invention illustrated by working examples will be described below.

DETAILED DESCRIPTION OF THE PREFERRED EMBODIMENTS

The essential component of an electrode of an electrochemical cell is the electroactive material. The electroactive material of the positive electrodes in lithium electrochemical cells is usually a compound which is capable of reversibly incorporating lithium ions in its structure. Frequently used electroactive materials include transition metal oxides, mixed oxides of transition metals, sulphides of transition metals, or solid solutions of chalcogenides of transition metals with other metals, or any compound which is capable of reversibly intercalating lithium ions and is stable at the temperature of operation of the electrochemical cell. The above compounds are most often utilized as cathode active materials, but can be used as anode active materials as well, under certain circumstances.

The electroactive materials, in particular the positive active materials, usually in the form of small particles are mixed with a binder compound to form a paste. A frequently used binder is a fluoride containing polymer, such as a vinylidene fluoride copolymer, in particular a vinylidene fluoride—hexafluoropropylene copolymer. The binder is usually admixed in less than 12 wt. %, more conveniently in about 3–8 wt. %.

The electroactive material bearing mixture is subsequently brought in contact with an oxidation and corrosion resistant metal current collector. Commonly used current collectors for positive active material containing electrodes are sheets of aluminum, stainless steel high in molybdenum and chromium, titanium, graphite sheet, foils of aluminum, grid or woven mesh of filaments made of the above metals, or aluminum foil carried on a tough, preferably moisture impermeable, polymeric laminate. The surface of the current collector is usually cleaned of corrosion products or grease, or similar contaminants, before contacting the electrode. The current collectors conveniently have an extension, such as a tab or lead, which provide means for the lithium battery or electrochemical cell to be connected to electrical equipment for charging or discharging.

As discussed hereinabove, most electrochemical cells or batteries provide a path for the electrons generated by the electrochemical reaction to proceed to and from the current collectors. Electrically conductive particles, most frequently fine carbon particles are mixed with the electrode components. It has, however, been observed that the binder in the electroactive material-binder mixture may coat some of the fine carbon particles. Commonly used binder compounds are insulators or ionically conducting materials, thus the binder coat may reduce the conductivity of the fine carbon particles added specifically to diminish the impedance of the mixture. As has been mentioned above, in some of the known lithium cell assemblies a carbon particle bearing layer is placed between the electrode, usually the cathode, and the current collector surface for increasing or promoting adhesion. The film forming component of the layer is frequently a poorly conducting polymeric material. In such instances some of the carbon particles can be isolated from one another by the polymer, thus the available paths for electron conduction may be notably diminished. It is known that there may be local variations in the ability of a current collector surface to conduct electrons. Hence lateral conductivity within an electron conductive coating as well as in an electrode layer can beneficially affect the impedance of an electrode—current collector assembly. It has now been found that if carbon fibres are added to the electroactive material containing mixture, and to the material forming a layer or coating between the current collector and the electrode layer, the conductivity within the electrochemical cell or battery is increased.

As briefly noted above, lithium based electrochemical cells have lithium ion conducting non-aqueous electrolytes placed between the cathode and the anode of the cell. The electrolyte can be a conventional porous or microporous polymer which is impregnated with a lithium salt containing non-aqueous liquid, or it can be a solid or gelled polymer containing a dissociable lithium compound. Alternatively, the particles of electroactive material are mixed with granules of a mobile lithium ion containing polymer and the mixture is loaded on a metal current collector, thus providing a composite current collector-electrode-electrolyte layer. Such composites are usually separated by a porous separator from the other electrode. There are several known arrangements for assembling lithium ion based electrochemical cells having an anode, a cathode, lithium ion conducting electrolyte and current collectors. The present invention is directed to the utilization of mixtures of carbon fibres and fine carbon, in enhancing the passage of electrons between the electroactive component, in particular the positive active component, and the current collector, in planar or laminar lithium cells. However, such carbonaceous conductive particles may be used in other types of batteries as well.

In one embodiment of the present invention the internal conductivity, in other words, the electron transfer between the electrode of the lithium battery and the current collector is enhanced by placing a mixture of carbon fibres and fine carbon along the interface between the electrode and the current collector. The mixture of carbon fibres and fine carbon are admixed in a fluorinated polymer and coated on the face of the current collector which is in contact with the positive electrode of the lithium cell or battery. The type of fine carbon in this utilization may be any fine carbon such as carbon black, Shawinigan black, acetylene black or any carbon product having similar size range. A preferred carbon black contains predominantly elongated crystalline carbon particles, such as marketed by Akzo Nobel Chemicals Inc. under the tradename of "Ketjen Black". The convenient carbon fibre for this application has less than 10 $\mu$m diameter and average length, preferably, longer than 35 $\mu$m, that is, the aspect ratio of the fibres is in excess of 5, and preferably in excess of 10. The carbon fibres or mixture of carbon fibres and fine carbon are blended with a fluorinated polymer, most conveniently with a vinylidene fluoride containing copolymer, referred to hereinafter as polyvinylidene fluoride copolymer. It is preferred that the fluorinated polymer has melting point higher than 70° C. The blended fluorinated polymer—carbon particle bearing coating mixture preferably contains higher than 60 wt. % carbonaceous particles. The upper limit of the carbon content is dictated by convenience only. The mixture of carbonaceous particles and fluorinated polymer is coated on the face of the current collector designed to be in contact with the positive electrode in a thickness to yield a coherent layer of less than 25 $\mu$m, preferably less than 15 $\mu$m. To enhance the ease of application of the mixture to the current collector face, it may be convenient to add a few percents of commercially available, low boiling point solvent, such as toluene, acetone, n-methyl pyrrolidinone also known as NMP, and/or similar compatible organic solvent. The coating is applied by brushing or dipping, and is allowed to dry before contact is made with the electrode. The coated current collector may be heated to accelerate drying. The preferred composition of the carbonaceous particles in the coating is 5–15 wt. % carbon fibres, the balance being fine carbon. The carbon fibre and fine carbon mixture is blended with the fluorinated polymer solution in a conventional manner.

In another embodiment of the invention the electron conductivity of the electrode of a lithium cell or battery is enhanced by admixing a mixture of carbon fibres and fine carbon in the electrode components. As discussed above, the electrode commonly comprises electroactive particles, an electron conducting component and a binder, preferably an ionically conducting binder compound, in an amount sufficient to provide a coherent paste. The electron conducting component is added in less than 12 wt. %, and usually higher than 3 wt. %, however, this is dictated by particle size and specific gravity of the electrode components.

It is noted that the object in assembling a lithium electrochemical cell is to avoid unnecessary dilution of the electroactive materials present in order to maximize energy density per volume or weight of the cell. In other words, the carbonaceous particles are added to the electrode, and/or to the coating on the current collector surface in amounts sufficient to reduce the impedance of the cell to a desirable level. It is convenient to utilize the same type of carbon fibres and fine carbon in the electrode as in the conductive coating between the electrode and current collector of the cell, however, this is not a requirement for the working of the invention. The mixture of carbon fibres and fine carbon, is applied as a conductivity enhancer in the positive electrodes of a lithium cell, but may be used in a negative electrode as well, depending on the nature of the electroactive component of the latter. The carbonaceous particles in the electrode paste preferably contain carbon fibres in 5–15 wt. %, based on the total weight of the carbonaceous particles added.

The cathode paste is loaded on the current collector by doctor's blade method but any convenient commercially available method will do. In one form of utilization the cathode-active material, the carbon fibre—fine carbon mixture and a fluoride containing polymer binder are blended together for a relatively short period and the obtained paste is then loaded onto the current collector to form a layer which is usually notably thicker than 50 µm, but the electrode layer thickness is determined by convenience only. Care is to be taken that the carbon fibres are not unduly broken during blending. The fluorinated polymer having melting point greater than 70° C., is conveniently dissolved in a suitable, low boiling point solvent. The presence of the solvent increases fluidity in the mixture and allows blending without breaking the fibres. The electrode layer is allowed to dry, or can be heated to accelerate drying, before it is brought into contact with a lithium ion-bearing polymer serving as electrolyte. The preferred fluorinated polymer binder in this invention is a copolymer of polyvinylidene fluoride, a compound capable of allowing the passage of lithium ions. The same copolymer of polyvinylidene fluoride may be used in the electrically conductive carbonaceous particle bearing coating on the current collector, however, this is a matter of choice. It is noted also that it is not essential that the polymer in the coating which carries the conductive particles be an ionically conductive substance but it may be convenient.

EXAMPLE 1

8 g of carbon fibres having 7.5 µm average diameter and 60 µm average length, or aspect ratio 8, were mixed by hand with 52 g petroleum coke. 20 g of polyvinylidene fluoride—hexafluoro propylene copolymer, marketed under the name of Kynar, was made fluid by adding 200 ml NMP-acetone solvent to it. The prepared mixture of carbon fibres and coke was added to the fluidized polymer and blended by hand. The solution of carbon particle containing polymer was painted on one face of an aluminum foil supported on a polymer laminate, to provide a thin, continuous layer. The layer was dried under a heat lamp. A lithium-cobalt oxide, 5 wt. % polyvinylidene fluoride—hexafluoro propylene copolymer and 10 wt. % fine carbon containing conventional positive electrode mixture was applied to the dry, coated surface of the aluminum foil by doctor's blade method to provide a 190 µm thick electrode-current collector composite for use in a lithium cell.

EXAMPLE 2

A positive electrode material made of lithium-cobalt oxide-polyvinylidene copolymer mixture as in Example 1, and a blended mixture of 7 parts of Shawinigan black and 1 part of carbon fibres, the latter carbon particle mixture being added in 10 wt. % based on the weight of the electrode-binder mixture, were combined with NMP-acetone solvent in sufficient amount to permit good mixing of the components. The resulting electrode paste was coated by means of doctor's blade onto another segment of the coated aluminum current collector prepared in Example 1, to yield a 190 µm thick layer. The electrode layer located on the current collector was allowed to dry under a heat lamp.

In a comparative test C, a lithium-cobalt oxide-polyvinylidene fluoride copolymer binder and 10 wt. % Shawinigan black containing mixture, that is the same basic cathode composition as in Examples 1 and 2, but without the carbon fibres added in the positive electrode in Example 2, was prepared to provide a conventional positive electrode of 190 µm thickness, and subsequently was positioned to be in contact with an aluminum foil bearing polymer laminate, for incorporation in a conventional laminar lithium cell.

EXAMPLE 3

The positive electrode-current collector assemblies for use in a rechargeable laminar lithium cell, prepared in Examples 1, 2 and comparative test C, and having similar thickness, were each subjected to resistance measurements by known methods, between the surface to be brought in contact with an electrolyte layer, and the current collector.

The average of ten resistance measurements of each electrode-current collector assembly is shown below:

Example 1: $290.10^{-3}$ ohm.cm

Example 2: $180.10^{-3}$ ohm.cm

Test C: $2190.10^{-3}$ ohm.cm

It can be seen that the average resistance of the electrode-current collector assembly having carbon fibres in the electrode mixture and in the coating layer between the electrode and the current collector, is the lowest. The average resistance of a conventional electrode supported on a current collector coated with a carbon fibre-fine carbon mixture bearing polymer is somewhat higher. The average resistance of a conventional electrode-current collector assembly prepared to have the same thickness but containing no carbon fibre in the electrode and having no conductive coating between the current collector and the adjacent electrode, is nearly an order of magnitude higher.

EXAMPLE 4

Lateral resistance of an electrically conductive coating carried on an inert non-conductive layer replacing the current collector, and prepared in accordance with this invention, was measured by inserting measuring probes in the coating as shown on FIG. 1. Assembly 10 represents schematically an inert plastic strip 12, coated with a carbon fibre-fine graphite-polyvinyl idene fluoride-hexafluoro propylene copolymer mixture bearing layer 14, prepared using the same carbon fibre-fine graphite ratio as described in Example 1. The inert non-conducting plastic strip was 100 mm wide and long enough to be coated on one of its faces with a 100 mm wide and p420 mm long layer 14. The thickness of the coating was 40 µm. Probes 16' and 16" were inserted below the coating surface close to the edges 13, as shown. The probes were connected to a high sensitivity Hewlitt Packard 4-point multimeter. 6 readings were taken, giving an average lateral resistance value of 21.48 ohms.

A similar inert plastic strip was coated with a similar conductive particles containing layer in the same length, width and depth as above, but the coating contained only fine graphite. The composition of the coating was 75 wt. % fine graphite mixed into 25 wt. % polyvinylidene fluoride-hexafluoro propylene copolymer. The average of 6 lateral resistance measurements was found to be 332 ohms.

It can be seen that the presence of the graphite fibres increased the conductivity of the coating by about one order of magnitude.

It is noted that in the above examples polyvinylidene fluoride-hexafluoro propylene copolymer was used as the carrier of the carbon fibres-fine carbon mixtures, however, another fluorinated polymer having melting point higher than 70° C., or its chemical equivalent could equally well have been used.

EXAMPLE 5

A thin titanium sheet was coated on both faces with a composition made of a mixture of elongated carbon crystallites marketed as 'Ketjen Black', and carbon fibres blended with polyvinylidene fluoride copolymer. The carbon particles were present in 65 wt. %. The carbon particles were a blend of 7 parts of Ketjen Black, and 1 part carbon fibres having average dimensions as stated in Example 1. The coating was prepared as described in Example 1. A positive electrode mixture was made of components as detailed in Example 2, but having admixed carbon particles composed of Ketjen Black and carbon fibres in the same ratio as in the coating on the titanium current collector. The electrode mixture was blended with granules of polyethylene oxide containing 6% $LiPF_6$. The electrolyte granules had average particle size of 50 gm. The blended mixture was deposited in a layer over the coated faces of the titanium sheet. The composite current collector-electrode-electrolyte was incorporated in a rechargeable lithium battery. The obtained lithium battery exhibited lower impedance than a similar lithium battery having conventional carbon particles admixed as electron conducting additive.

As was described in the foregoing paragraphs and shown in the examples, carbon fibres added as electron conductive components in lithium cells improve the performance of lithium batteries.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

We claim:

1. In a lithium battery having an anode and anode current collector, lithium ion conducting electrolyte, a cathode containing a positive active material, a cathode current collector and an electrically conducting coating between said cathode current collector and said cathode containing positive active material, the improvement comprising that said electrically conducting coating is comprising a mixture of fine carbon and 5–15 wt. % carbon fibres further admixed with a fluorinated polymer having melting point higher than 70° C., in an amount not exceeding 40 wt. %.

2. An improved lithium battery as claimed in claim 1, wherein said fluorinated polymer having melting point higher than 70° C., is a copolymer comprising polyvinylidene fluoride.

3. An improved lithium battery as claimed in claim 1, wherein said fine carbon in said mixture comprises elongated crystallites of fine carbonaceous particles.

4. An improved lithium battery as claimed in claim 1, wherein said positive active material is a transition metal chalcogenide or a solid solution of transition metal chalcogenides.

5. An improved lithium battery as claimed in claim 1, wherein said cathode current collector is selected from the group consisting of metal foil, metal plate, metal grid, metal mesh and metal foil supported by a polymeric laminate.

6. A rechargeable laminar lithium battery comprising,
an anode capable of reversibly intercalating lithium ions and an anode current collector,
a lithium ion conducting electrolyte, and
a cathode layer comprising a positive active material capable of reversibly intercalating lithium ions, an adjacent cathode current collector, and an electrically conducting coating between said cathode layer and said adjacent cathode current collector, said electrically conducting coating further comprising a mixture of fine carbon and 5–15 wt. % carbon fibres, admixed with a fluorinated polymer having melting point higher than 70° C., in an amount not exceeding 40 wt. %.

7. A rechargeable laminar lithium battery as claimed in claim 6, wherein said fluorinated polymer having melting point higher than 70° C., is a copolymer comprising polyvinylidene fluoride.

8. A rechargeable laminar lithium battery as claimed in claim 6, wherein said fine carbon in said mixture is comprising elongated crystallites of fine carbonaceous particles.

9. In a lithium battery having an anode, an anode current collector, a lithium ion conducting electrolyte, a cathode containing a positive active material, electrically conducting particles and a polyvinylidene fluoride bearing binder compound capable of conducting lithium ions, in less than 12 wt. %, the improvement comprising that said electrically conducting particles are composed of a mixture of carbon and 5–15 wt. % carbon fibres.

10. An improved lithium battery as claimed in claim 9, wherein said carbon in said mixture is further comprising elongated crystallites of fine carbonaceous particles.

11. An improved lithium battery as claimed in claim 9, wherein said positive active material is a transition metal chalcogenide or a solid solution of transition metal chalcogenides.

12. A rechargeable laminar lithium battery comprising,
an anode capable of reversibly intercalating lithium ions and an anode current collector,
a lithium ion conducting electrolyte,
a cathode layer comprising a positive active material capable of reversibly intercalating lithium ions, electrically conducting particles and a polyvinylidene fluoride bearing binder compound capable of conducting lithium ions, in less than 12 wt. %, wherein said electrically conducting particles are composed of a mixture of fine carbon and 5–15 wt. % carbon fibres, and
an adjacent cathode current collector.

13. A rechargeable laminar lithium battery comprising,
an anode capable of reversibly intercalating lithium ions and an anode current collector, a lithium ion conducting electrolyte, a cathode layer comprising a first mixture of a positive active material capable of reversibly intercalating lithium ions, electrically conducting particles composed of fine carbon and 5–15 wt % carbon fibres, and a polyvinylidene fluoride bearing binder compound capable of conducting lithium ions in less than 12 wt. %, a cathode current collector adjacent said cathode layer, and an electrically conducting coating between said cathode layer and said cathode current collector, said electrically conducting coating further comprising a second mixture of a fluorinated polymer having melting point higher than 70° C., in an amount not exceeding 40 wt. %, and carbonaceous particles composed of fine carbon and 5–15 wt. % of carbon fibres.

14. A rechargeable laminar lithium battery as claimed in claim 13, wherein said fine carbon in said electrically conducting particles comprised in said first mixture is further comprising elongated crystallites of fine carbonaceous particles.

15. A rechargeable laminar lithium battery as claimed in claim 13, wherein said fine carbon in said carbonaceous particles comprised in said second mixture is further comprising elongated crystallites of fine carbonaceous particles.

16. A rechargeable laminar lithium battery as claimed in claim 13, wherein said fluorinated polymer having melting point greater than 70° C. in said second mixture, is a copolymer comprising polyvinylidene fluoride.

* * * * *